United States Patent
Liu et al.

(10) Patent No.: US 12,483,122 B2
(45) Date of Patent: Nov. 25, 2025

(54) RESONANT CONVERTER AND METHOD FOR CONTROLLING THE RESONANT CONVERTER

(71) Applicant: Delta Electronics (Shanghai) Co., Ltd., Shanghai (CN)

(72) Inventors: Hong Liu, Shanghai (CN); Baihui Song, Shanghai (CN); Wenfei Hu, Shanghai (CN); Cheng Lu, Shanghai (CN); Hongyang Wu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 283 days.

(21) Appl. No.: 18/059,955

(22) Filed: Nov. 29, 2022

(65) Prior Publication Data
US 2023/0179091 A1 Jun. 8, 2023

(30) Foreign Application Priority Data
Dec. 7, 2021 (CN) .......................... 202111484320.5

(51) Int. Cl.
*H02M 3/335* (2006.01)
*H02M 3/00* (2006.01)

(52) U.S. Cl.
CPC ......... *H02M 3/01* (2021.05); *H02M 3/33573* (2021.05); *H02M 3/33576* (2013.01)

(58) Field of Classification Search
CPC ...... H02M 3/01; H02M 3/015; H02M 1/0058; H02M 3/33569–33592; H02J 50/12
See application file for complete search history.

(56) References Cited

U.S. PATENT DOCUMENTS 8,811,039 B2 * 8/2014 The Ngo ........... H02M 3/33584
363/21.02
9,755,537 B2 * 9/2017 Kolar ....................... H02M 7/49
(Continued)

FOREIGN PATENT DOCUMENTS

CN 111279577 A 6/2020

OTHER PUBLICATIONS

S. Hu, M. Lu, B. Luan and X. Li, "Discontinuous-current mode operation of a semi-dual-bridge resonant converter," 2016 IEEE International Conference on Industrial Technology (ICIT), Taipei, Taiwan, 2016, pp. 293-298 (Year: 2016).*
(Continued)

*Primary Examiner* — Gary L Laxton
*Assistant Examiner* — Jennifer C Caulk
(74) *Attorney, Agent, or Firm* — CKC & Partners Co., LLC

(57) ABSTRACT

The application discloses a resonant converter and a method for controlling the same. The resonant converter includes: a resonant tank, a first circuit electrically connected to a first end of the resonant tank, and a second circuit electrically connected to a second end of the resonant tank; the first circuit including at least one primary switch, the second circuit including at least one controllable switch, and controlling the at least one controllable switch according to a secondary initial switching frequency, such that the second circuit outputs power, adjusting a secondary switching frequency of the at least one controllable switch according to the secondary initial switching frequency and a signal reflecting the power of the second circuit, such that the secondary switching frequency of the second circuit follows a primary switching frequency of the first circuit.

21 Claims, 16 Drawing Sheets

(56) References Cited

U.S. PATENT DOCUMENTS

| | | | |
|---|---|---|---|
| 10,236,720 B2 * | 3/2019 | Moon | H02J 50/12 |
| 2021/0226534 A1 * | 7/2021 | Lu | H02M 3/01 |

OTHER PUBLICATIONS

Xu Fei et al: "Overall Loss Compensation and Optimization Control in Single-Stage Inductive Power Transfer Converter Delivering Constant Power", IEEE Transactions on Power Electronics, Institute of Electrical and Electronics Engineers, USA, vol. 37, No. 1, Jul. 26, 2021 (Jul. 26, 2021), pp. 1146-1158.

Hu Song et al: "Discontinuous—current mode operation of a semi-dual-bridge resonant converter", 2016 IEEE International Conference on Industrial Technology (ICIT), IEEE, Mar. 14, 2016 (Mar. 14, 2016), pp. 293-298.

\* cited by examiner

RESONANT CONVERTER AND METHOD FOR CONTROLLING THE RESONANT CONVERTER

CROSS-REFERENCE TO RELATED APPLICATIONS

This non-provisional application claims priority under 35 U.S.C. § 119(a) on Patent Applications No. 202111484320.5 filed on Dec. 7, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The embodiments of the invention relate to the technical field of power electronic converters, and particularly to a resonant converter and a method for controlling the resonant converter.

BACKGROUND

Resonant converters (LLCs) are applied to solid-state transformers (SST), and have a wide application prospect in direct current power utilization or power generation fields such as data center, electric vehicle charging station, photovoltaic and energy storage. In these application scenarios, the input of the SST is a medium-voltage alternating current (MVAC), and the output is a low-voltage direct current (LVDC), and generally, the output voltage shall be within a wide range. Moreover, the SST may include multiple phases, each phase including a plurality of cascaded power modules, and each power module including a pre-stage AC-DC converter and a post-stage DC-DC converter. In the DC-DC converter of the SST, the primary medium-voltage side (i.e., a primary side) and the secondary low-voltage side (i.e., a secondary side) are isolated by an insulating plate of a high-frequency transformer, but existing communication connection of optical fibers at primary and secondary sides is complex, operation is inconvenient, and with an increase in the number of power modules in each phase, the number of optical fibers desired by the post stage is increased. Since the existing product solution has an extremely high requirement for the reliability of communication of the optical fibers, once a communication failure occurs, it easily causes a system down. In addition, it is difficult for the LLC to rise the voltage only through frequency modulation and voltage regulation, and a regulating range of the switching frequency is large, which affects the efficiency.

To solve the above problems, a conventional method is that the resonant converter controls the secondary side switches to be turned on or off with a delay to reduce the regulating range of a frequency for frequency modulation and voltage rising. The primary side regulates a primary switching frequency in a closed-loop manner by sampling the output voltage, the secondary side acquires synchronous information of the primary switching frequency by sampling a zero crossing point of a resonant current at the primary side, and calculates a delay time of the secondary switches in an open-loop manner, thereby reducing frequency modulation range to a certain extent. However, in this method, frequency modulation of the primary side shall sample the output voltage, control of the secondary switches shall sample the zero crossing point of the current of the resonant tank at the primary side, and both are dependent on communication between the primary and secondary sides. When the system works under a light load, there is a higher requirement for sampling of the zero crossing point of the current, thereby not facilitating control when the load changes in a full range. Furthermore, the secondary side in this method can only work in a current continuous state, and when turned off, the delayed off switches with the current will affect efficiency of the system. Another conventional method is to use an induction power converter, and a receiving end is half control rectification, a transmitting end and the receiving end do not have communication there between; a carrier frequency of the receiving end is fixed, i.e., the switching frequency is fixed, and the output voltage is sampled to control a phase-shifting angle in a closed-loop manner within the switches at an output side; the transmitting end achieves phase-shifting control within the switches at the transmitting end to indirectly control the output voltage through a phase-shifting angle between the voltage and the current of the resonant tank. As can be seen, the second method is similar with the first method, and shall sample the current of the resonant tank to acquire synchronous information of the switching frequency. Moreover, the receiving side can only work in a current continuous state, and when turned off, the delayed off switches with the current will affect efficiency. Meanwhile, in the second method, the switching frequency at the receiving end is fixed, and the output voltage is controlled by regulating the phase-shifting angle of the primary and secondary sides.

SUMMARY

The disclosure provides a resonant converter and a method for controlling the resonant converter, which controls the secondary switching frequency and the phase-shifting angle in a closed-loop manner to achieve non-communication high efficient operation between the primary and secondary sides of the resonant converter through the output voltage of the resonant converter.

To realize the above object, the following technical solution is disclosed:

On one hand, the disclosure provides a resonant converter, resonant converter includes a resonant tank, a first circuit electrically connected to a first end of the resonant tank, and a second circuit electrically connected to a second end of the resonant tank; the resonant tank includes a transformer having a primary winding electrically connected to the first end of the resonant tank, and a secondary winding electrically connected to the second end of the resonant tank;

the first circuit includes at least one primary switch, the second circuit includes at least one controllable switch, setting a secondary initial switching frequency, and the at least one controllable switch is controlled according to the secondary initial switching frequency, such that the second circuit outputs power, and a secondary switching frequency of the at least one controllable switch is adjusted according to the secondary initial switching frequency and a signal reflecting the power of the second circuit, such that the secondary switching frequency of the second circuit follows a primary switching frequency of the first circuit.

On the other hand, the disclosure provides a cascade system, including at least two cascaded power modules, each of the at least cascaded power modules includes an AC-DC converter and a DC-DC converter, and the DC-DC converter includes the resonant converter.

In order to better realize the object of the disclosure, the disclosure further provides a method for controlling a resonant converter applied to the resonant converter, the control method includes the following steps:

(a) providing a resonant converter, wherein the resonant converter includes a resonant tank, a first circuit electrically connected to a first end of the resonant tank, and a second circuit electrically connected to a second end of the resonant tank; the resonant tank includes a transformer having a primary winding electrically connected to the first end of the resonant tank, and a secondary winding electrically connected to the second end of the resonant tank; the first circuit includes at least one primary switch, the second circuit includes at least one controllable switch;

(b) setting a secondary initial switching frequency, and controlling the at least one controllable switch according to the secondary initial switching frequency, such that the second circuit outputs power, and (c) adjusting a secondary switching frequency of the at least one controllable switch according to the secondary initial switching frequency and a signal reflecting the power outputted by the second circuit, such that the secondary switching frequency of the second circuit follows a primary switching frequency of the first circuit.

Compared with the prior art, the disclosure have all or partial advantageous technical effects:

The technical solution disclosed by the disclosure follows the switching frequency and controls the output voltage by sampling the output voltage, thereby achieving non-communication control between the primary and secondary sides of the resonant converter. The solution reduces sampling cost without sampling of the resonant tank, and the secondary side may work in a current discontinuous state, thereby reducing turn-off loss of the secondary side. When there is no communication between the primary and secondary sides of the resonant converter, and the primary side cannot obtain information of the output voltage, the system in this solution can operate stably, achieve rising of the output voltage and reduce a frequency modulation range by controlling switches on the secondary side, thereby improving efficiency.

Hereinafter the disclosure is described in details with reference to the accompanying drawings and the detailed embodiments, but the disclosure is not limited thereto.

DETAILED DESCRIPTION

Figure 1:
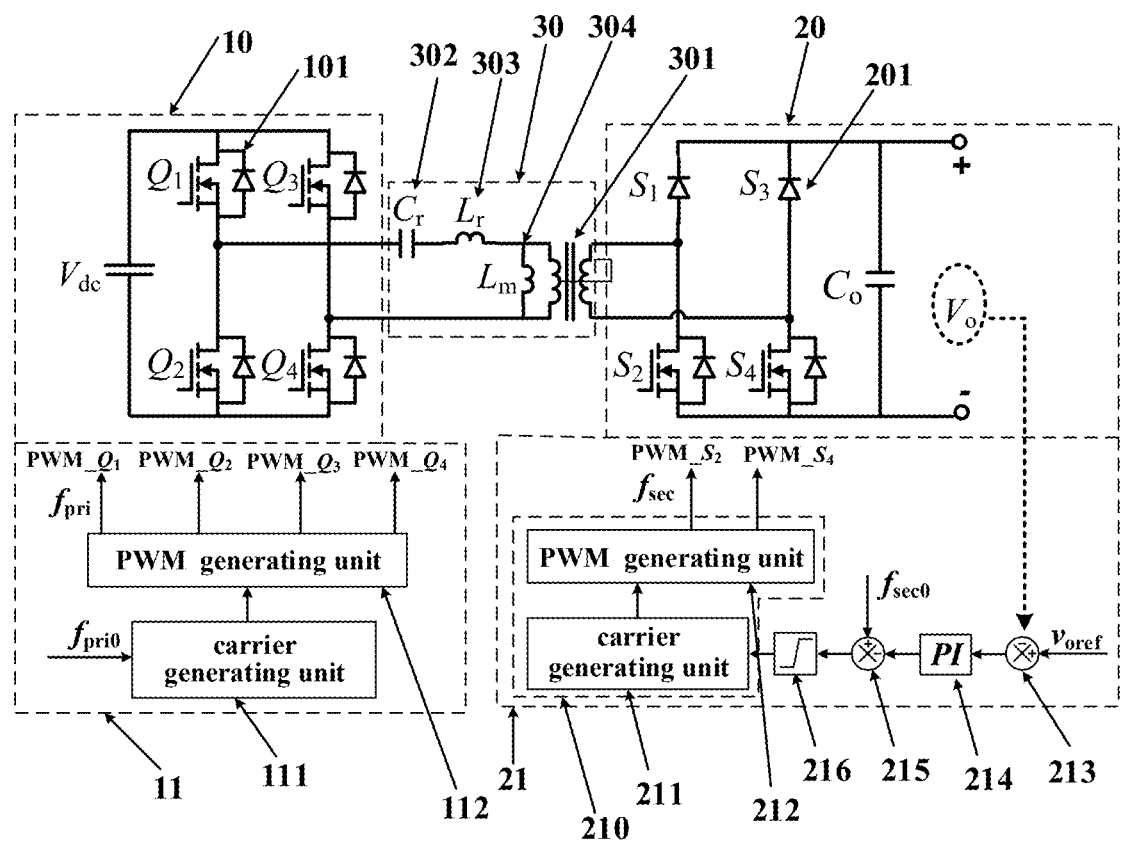
FIG. 1 is a schematic diagram of a first embodiment of the resonant converter according to the invention.

Hereinafter the technical solution of the invention is described in details with reference to the accompanying drawings and the detailed embodiments to further understand objects, solutions and effects of the invention, but the protection scope of the appended claims of the invention is not limited thereto.

The specification and subsequent claims use certain phrases to name specific components or parts, and those ordinary in the art shall understand that technical users or manufacturers can use different nouns or terms to call the same component or part. The specification and subsequent claims do not distinguish the components or parts with difference of names, but difference in functions as distinguishing criterion. In the whole specification and subsequent claims, "comprise" and "include" mentioned are open words, so they shall be explained to "include but not limited to". Moreover, the word "connect" includes any direct or indirect electrical connection means. Indirect electrical connection means includes connection through other devices.

It shall be noted that in the description of the invention, orientations or positional relations or parameters indicated by terms "transverse", "longitudinal", "up", "down", "front", "back", "left", "right", "vertical", "horizontal", "top", "bottom", "in", "out" and "about", or "about", "substantially", "around" are orientations or positional relations illustrated in the figures, and only to describe the invention and simplify the description, not indicating or suggesting that the referred device or element must have specific orientations, specific sizes or constructed or operated in specific orientations, so they also cannot be understood as limitation to the invention.

Principle of the disclosure is to follow the secondary switching frequency and control the phase-shifting angle through a closed-loop control of the output voltage of the resonant converter, thereby achieving non-communication control between the primary and secondary sides of the resonant converter and stability of the output voltage. Specifically, the resonant converter includes a resonant tank having a first end and a second end, a first circuit electrically connected to the first end of the resonant tank and a second circuit electrically connected to the second end of the resonant tank, the first circuit includes at least one primary switch, and the second circuit includes at least one controllable switch. In the disclosure, the second circuit may output power by setting a secondary initial switching frequency, and controlling the at least one controllable switch according to the secondary initial switching frequency. Moreover, a secondary switching frequency of the at least one controllable switch may be adjusted according to the secondary initial switching frequency and a signal reflecting the power of the second circuit, such that the secondary switching frequency of the second circuit follows a primary switching frequency of the first circuit, thereby achieving non-communication control between the primary and secondary sides of the resonant converter. Furthermore, the output voltage may be stabilized by controlling a phase-shifting angle between the at least one controllable switch and the at least one primary switch.

FIG. 1 is a schematic diagram of a first embodiment of the resonant converter according to the invention. As shown in FIG. 1, the embodiment of the invention provides a resonant converter, including a resonant tank 30, a first circuit 10 electrically connected to a first end of the resonant tank, and a second circuit 20 electrically connected to a second end of the resonant tank. The first circuit 10 may include at least one primary switch 101. The second circuit 20 may include at least one controllable switch 201. The resonant tank 30 may include a transformer 301 having a primary winding electrically connected to the first end of the resonant tank 30, and a secondary winding electrically connected to the second end of the resonant tank 30. In other embodiments, the resonant tank 30 may further include a resonant capacitor 302, a resonant inductor 303 and a magnetizing inductor 304 connected in series to the transformer 301.

The resonant converter may further include a primary control module 11, which generates a driving signal of the primary switch 101 according to a signal of the primary switch frequency. In some embodiments, the primary control module 11 may particularly include a first carrier generating unit 111 and a first PWM generating unit 112. The first carrier generating unit 111 may generate a primary triangular carrier wave according to a primary initial switching frequency $f_{pri0}$. The first PWM generating unit 112 may compare the primary triangular carrier wave, generated by the first carrier generating unit 111, with a set duty cycle to generate the driving signal of the primary switch 101, and the frequency of the driving signal of the primary switch 101 is the primary switching frequency $f_{pri}$.

Figure 2:
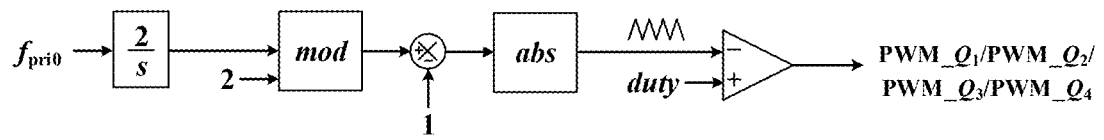
FIG. 2 is a schematic diagram of a process of generating the driving signal of the primary switch by the primary control module.

Specifically, process of generating the driving signal of the primary switch 101 by the primary control module 11 is shown in FIG. 2, wherein $f_s \cdot f_{pri0}$ represents the primary initial switching frequency, 2/s represents an integrator module, wherein 1/s is a transfer function of an integrator, 1 and 2 represent arithmetic operations, which result in the primary triangular carrier wave being within the range of 0 to 1, mod represents taking the remainder, ⊗ represents an adder module, abs represents taking an absolute value, and duty represents a duty cycle. The primary control module generates the primary triangular carrier wave with a cycle of $1/f_s f_{pri0}$ according to the primary initial switching frequency $f_s f_{pri0}$, and compares the generated primary triangular carrier wave with the set duty cycle duty to generate the driving signal of the primary switch.

The resonant converter may further include a secondary control module 21. In some embodiments, the secondary control module 21 may particularly include a voltage comparison module 213, a regulator 214, a frequency comparison module 215, an amplitude limiter 216 and a second carrier generating module 210. As shown in FIG. 1, the output end of the voltage comparison module 213 is connected to the input end of the frequency comparison module 215 through the regulator 214, and the voltage comparison module is configured to compare the output voltage $V_o$ of the second circuit 20 with a reference output voltage $V_{oref}$, and transmit a first signal outputted after regulation of the regulator 214 to the frequency comparison module 215. The regulator 214 converts a voltage difference between the output voltage $V_o$ of the second circuit 20 and the reference output voltage $V_{oref}$ into a frequency difference, which is the frequency difference between the secondary switching frequency $f_{sec}$ and the primary switching frequency $f_{pri}$. The output end of the frequency comparison module 215 is connected to the input end of the second carrier generating module 210 through the amplitude limiter 216, wherein the frequency comparison module 215 may be composed of an adder, and the frequency comparison module 215 is configured to compare a signal frequency outputted from the regulator 214 with the secondary initial switching frequency $f_{sec0}$ and adjust the secondary initial switching frequency $f_{sec0}$ based on the frequency difference, and transmit a second signal outputted after amplitude limiting of the amplitude limiter 216 to the second carrier generating module 210; the second carrier generating module 210 is configured to generate a driving signal of the controllable switch 201 based on the signal outputted from the amplitude limiter 216, and the frequency of the driving signal of the controllable switch is the secondary switching frequency $f_{sec}$, which follows the primary switching frequency $f_{pri}$. Preferably, the regulator 214 may use a proportional-integral regulator.

Similarly to the process of generating the driving signal of the primary switch 101, the second carrier generating module 210 may include a second carrier generating unit 211 and a second PWM generating unit 212; the second carrier generating unit 211 generates a secondary triangular carrier wave based on the signal frequency outputted from the amplitude limiter 216; the second PWM generating unit 212 compares the secondary triangular carrier wave generated by the second carrier generating unit 211 with a set duty cycle to generate the driving signal of the controllable switch 201.

FIG. 1 is a schematic diagram of a first embodiment of the resonant converter according to the invention. In this embodiment, the first PWM generating unit 112 includes multiple sets of driver circuits, which enable the first PWM generating unit 112 to generate four driving signals for the primary switch 101, namely the first primary driving signal PWM_$Q_1$, the second primary driving signal PWM_$Q_2$, the third primary driving signal PWM_$Q_3$, and the fourth primary driving signal PWM_$Q_4$. The frequency of the first primary driving signal PWM_$Q_1$, the frequency of the second primary driving signal PWM_$Q_2$, the frequency of the third primary driving signal PWM_$Q_3$, and the frequency of the fourth primary driving signal PWM_$Q_4$ are equal to the primary switching frequency $f_{pri}$. The primary switch 101 may particularly include a first switch $Q_1$, a second switch $Q_2$, a third switch $Q_3$ and a fourth switch $Q_4$.

The first primary driving signal PWM_Q$_1$ is used to drive the first switch Q$_1$, the second primary driving signal PWM_Q$_2$ is used to drive the second switch Q$_2$, the third primary driving signal PWM_Q$_3$ is used to drive the third switch Q$_3$, and the fourth primary driving signal PWM_Q$_4$ is used to drive the fourth switch Q$_4$. The first switch Q$_1$ and the second switch Q$_2$ are connected in series to form a first primary bridge arm, the third switch Q$_3$ and the fourth switch Q$_4$ are connected in series to form a second primary bridge arm, the first primary bridge arm and the second primary bridge arm are connected in parallel, and the middle point of the first primary bridge and the middle point of the second primary bridge arm are electrically connected to the first end of the resonant tank 30 respectively. The first switch Q$_1$, the second switch Q$_2$, the third switch Q$_3$ and the fourth switch Q$_4$ are metal oxide semiconductor field effect transistors. The second PWM generating unit 212 includes multiple driver circuits, which enable the second PWM generating unit 212 to generate two driving signals of the controllable switch 201, namely the second secondary driving signal PWM_S$_2$ and the fourth secondary driving signal PWM_S$_4$.

The frequency of the second secondary driving signal PWM_S$_2$ and the frequency of the fourth secondary driving signal PWM_S$_4$ are equal to the secondary switching frequency $f_{sec}$. The controllable switch 201 may particularly include a first controllable switch S$_1$, a second controllable switch S$_2$, a third controllable switch S$_3$ and a fourth controllable switch S$_4$. The second secondary driving signal PWM_S$_2$ is used to drive the second controllable switch S$_2$, and the fourth secondary driving signal PWM_S$_4$ is used to drive the fourth controllable switch S$_4$. The first controllable switch S$_1$ and the second controllable switch S$_2$ are connected in series to form a first secondary bridge arm, the third controllable switch S$_3$ and the fourth controllable switch S$_4$ are connected in series to form a second secondary bridge arm, the first secondary bridge arm and the second secondary bridge arm are connected in parallel, and the middle point of the first secondary bridge arm and the middle point of the second secondary bridge arm are electrically connected to the second end of the resonant tank 30. In the figure, V$_{dc}$ represents an input DC voltage, C$_r$, L$_r$ and L$_m$ represent a resonant capacitor, a resonant inductor and a magnetizing inductor, C$_o$ represents an output capacitor, V$_o$ represents an output voltage, V$_{oref}$ represents an output voltage reference value, $f_{pri}$ represents a primary switching frequency, and $f_{sec0}$ represents a secondary initial switching frequency.

Figure 3A:
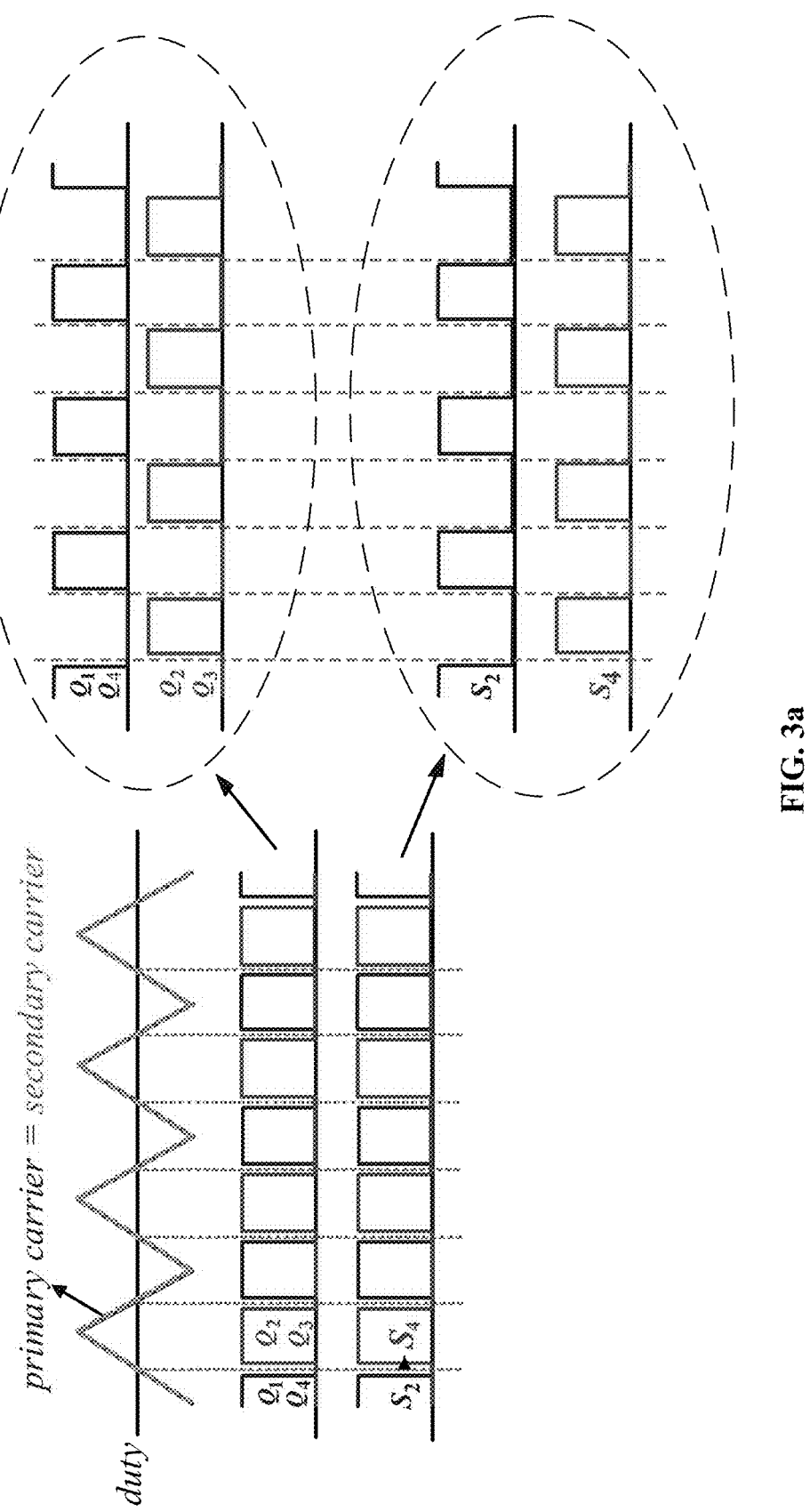
FIG. 3a is a synchronization principle diagram when the primary switching frequency and the secondary initial switching frequency are the same.
Figure 3B:
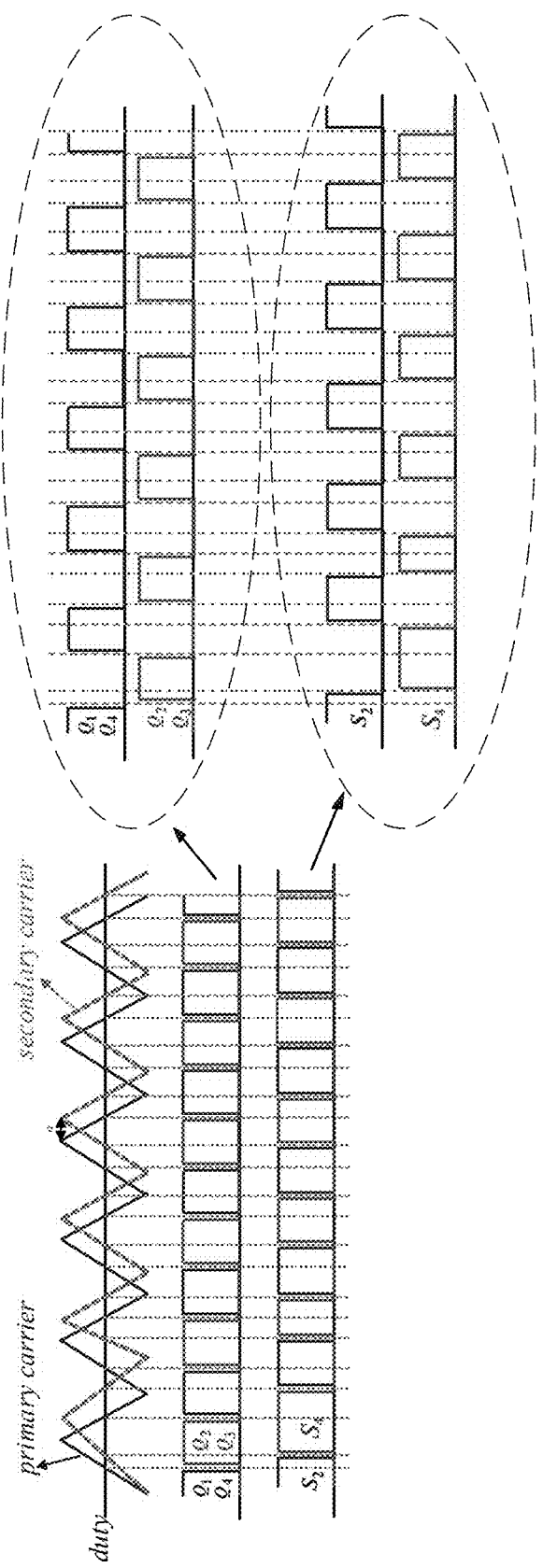
FIG. 3b is a synchronization principle diagram when the primary switching frequency and the secondary switching frequency are different.

FIG. 3a is a synchronization principle diagram when the primary switching frequency and the secondary initial switching frequency are the same, FIG. 3b is a synchronization principle diagram when the primary switching frequency and the secondary initial switching frequency are different. Taking a duty cycle of 0.5 for example, as shown in FIG. 3a, when the primary switching frequency is the same as the secondary initial switching frequency, the primary switch and the controllable switch act synchronously; as shown in FIG. 3b, when the primary switching frequency is different from the frequency of the controllable switch, the output voltage of the secondary control module 21 regulates the secondary switching frequency of the controllable switch in a closed-loop manner, such that the secondary switching frequency automatically follows the primary switching frequency, and controls a phase-shifting angle α between the controllable switch 201 and the primary switch 101 to stabilize the output voltage.

Referring to FIGS. 1 to 3b, in this embodiment, the primary switching frequency is $f_{pri}$, the duty cycle is 50%, and the secondary initial switching frequency $f_{sec0}$ can be the same, or also be different from the primary switching frequency $f_{pri}$. After compared with the output voltage reference value v$_{oref}$, the output voltage V$_o$ sampled on the secondary side regulates a carrier frequency on the secondary side in a closed-loop manner. After the system is stabilized, carrier frequencies on the primary and secondary sides are the same, and the secondary carrier wave lags behinds the primary carrier wave at a certain angle. That is, the fourth controllable switch S$_4$ on the secondary side lags behind the first switch Q$_1$ or the fourth switch Q$_4$ on the primary side by an angle, and when the output voltage is increased, the lagged angle is increased. Moreover, the second controllable switch S$_2$ and the fourth controllable switch S$_4$ are complementarily conducted to stabilize the output voltage. As can be known from FIGS. 1 to 3b, the resonant converter in this embodiment controls in a closed-loop manner to regulate frequencies on the primary and secondary sides only by sampling the output voltage on the secondary side without sampling of the resonant tank.

Figure 4:
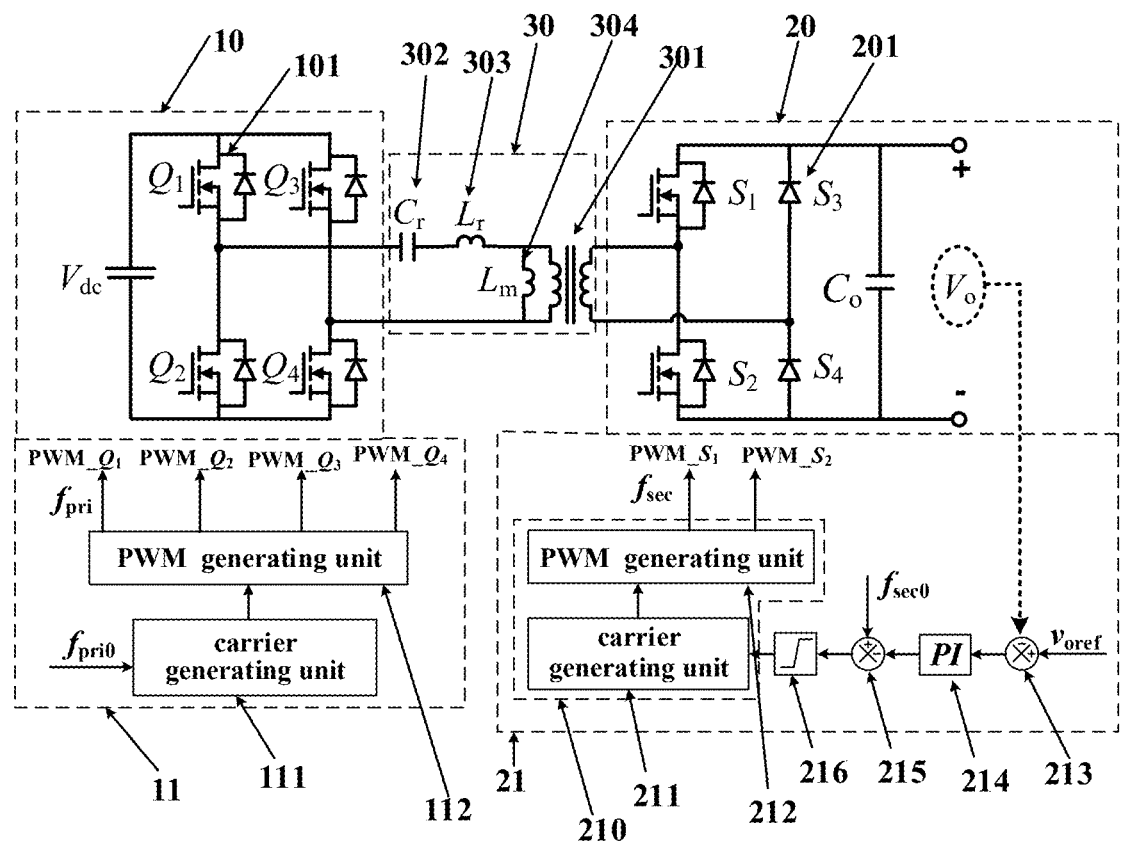
FIG. 4 is a schematic diagram of a second embodiment of the resonant converter according to the invention.

FIG. 4 is a schematic diagram of a second embodiment of the resonant converter according to the invention. As compared with the resonant converter shown in FIG. 1, the difference lies in connection way of the controllable switch 201 in the second circuit 20. In this embodiment, the second PWM generating unit 212 includes multiple driver circuits, which enable the second PWM generating unit 212 to generate two driving signals of the controllable switch 201, namely the second secondary driving signal PWM_S$_2$ and the first secondary driving signal PWM_S$_1$. The frequency of the second secondary driving signal PWM_S$_2$ and the frequency of the first secondary driving signal PWM_S$_1$ are equal to the secondary switching frequency $f_{sec}$. The controllable switch 201 may include a first controllable switch S$_1$, a second controllable switch S$_2$, a third controllable switch S$_3$ and a fourth controllable switch S$_4$. The second secondary driving signal PWM_S$_2$ is used to drive the second controllable switch S$_2$, and the first secondary driving signal PWM_S$_1$ is used to drive the first controllable switch S$_1$. The first controllable switch S$_1$ and the second controllable switch S$_2$ are connected in series to form a first secondary bridge arm, the third controllable switch S$_3$ and the fourth controllable switch S$_4$ are connected in series to form a second secondary bridge arm, the first secondary bridge arm and the second secondary bridge arm are connected in parallel, and the middle point of the first secondary bridge arm and the middle point of the second secondary bridge arm are electrically connected to the second end of the resonant tank 30. The first controllable switch S$_1$, the second controllable switch S$_2$ are metal oxide semiconductor field effect transistors, and the third controllable switch S$_3$ and the fourth controllable switch S$_4$ are diodes. About working principle and working process of the resonant converter in this embodiment, they are the same as that in the first embodiment, so the details are not repeated here. It shall be noted that the first controllable switch S$_1$, the second controllable switch S$_2$, the third controllable switch S$_3$ and the fourth controllable switch S$_4$ may be a combination of any of diodes and metal oxide semiconductor field effect transistors, but the embodiment of the invention is not limited thereto. The first embodiment and the second embodiment are preferable embodiments.

Figure 5:
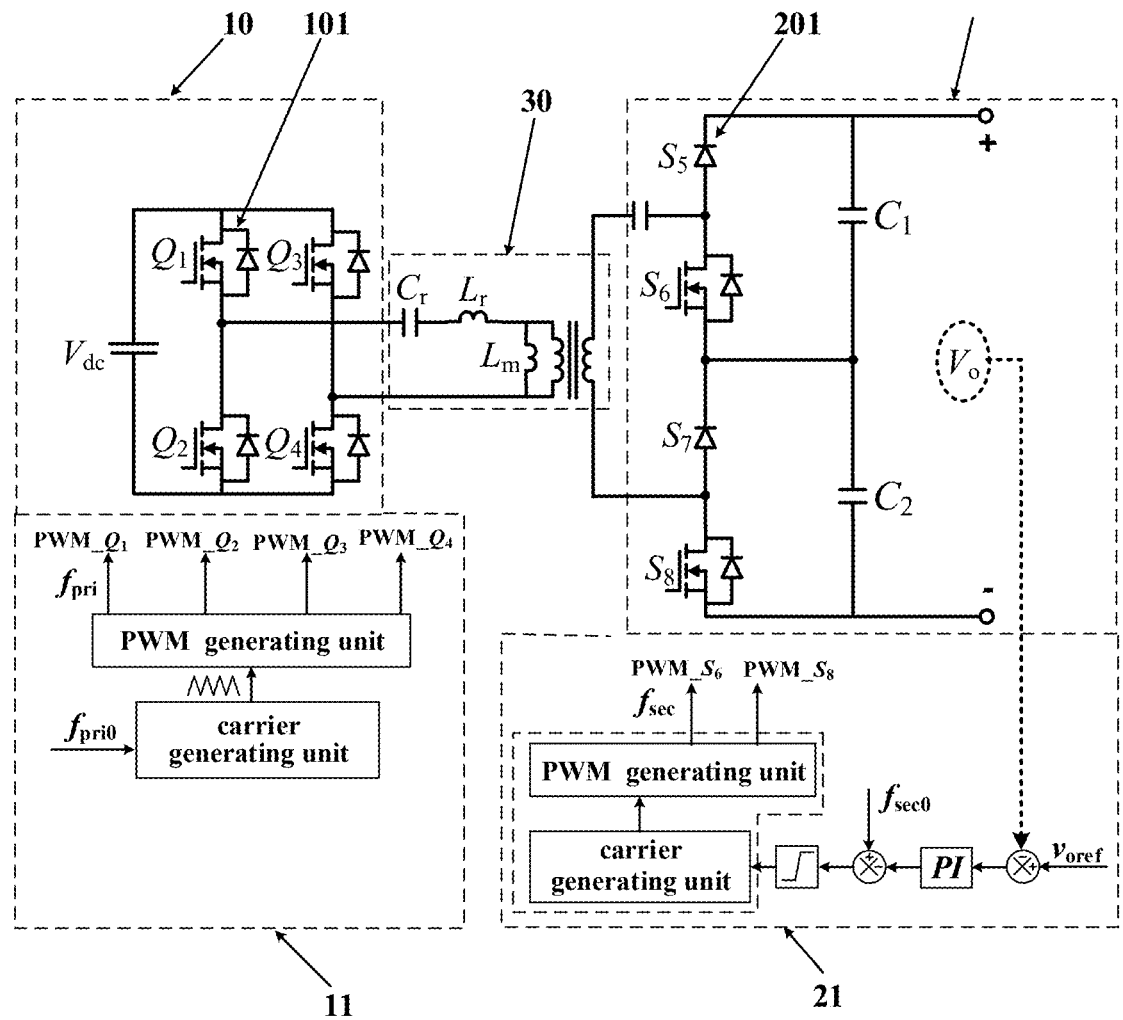
FIG. 5 is a schematic diagram of a third embodiment of the resonant converter according to the invention.

FIG. 5 is a schematic diagram of a third embodiment of the resonant converter according to the invention. When the resonant converter shown in FIG. 5 is compared with the resonant converter shown in FIG. 4, the difference lies in the connection way of the second circuit 20. In this embodiment, the second PWM generating unit 212 includes multiple driver circuits, which enable the second PWM generating unit 212 to generate two driving signals of the controllable switch 201, namely the sixth secondary driving signal PWM_S$_6$ and the eighth secondary driving signal PWM_S$_8$. The frequency of the sixth secondary driving signal PWM_S$_6$ and the frequency of the eighth secondary driving signal PWM_S$_6$ are equal to the secondary switching frequency f$_{sec}$. The controllable switch 201 may include a fifth controllable switch S$_5$, a sixth controllable switch S$_6$, a seventh controllable switch S$_7$ and an eighth controllable switch S$_8$. The sixth secondary driving signal PWM_S$_6$ is used to drive the sixth controllable switch S$_6$, and the eighth secondary driving signal PWM_S$_8$ is used to drive the eighth controllable switch S$_8$. The fifth controllable switch S$_5$, the sixth controllable switch S$_6$, the seventh controllable switch S, and the eighth controllable switch S$_8$ connected in series to form a third secondary bridge arm, the second circuit 20 may further include a capacitor bridge arm formed by a first capacitor C$_1$ and a second capacitor C$_2$ connected in series, the third secondary bridge arm and the capacitor bridge arm are connected in parallel, the middle point of the third secondary bridge arm and the middle point of the capacitor bridge arm are electrically connected, the second end of the resonant tank 30 is electrically connected between the common node of the controllable switch S$_5$ and the sixth controllable switch S$_6$ and the common node of the seventh controllable switch S$_7$ and the eighth controllable switch S$_8$. The fifth controllable switch S$_5$ and the seventh controllable switch S$_7$ are diodes, and the sixth controllable switch S$_6$ and the eighth controllable switch S$_8$ are metal oxide semiconductor field effect transistors. About working principle and working process of the resonant converter in this embodiment, they are the same as that in the first embodiment and the second embodiment, so the details are not repeated here. It shall be noted that the fifth controllable switch S$_5$ and the seventh controllable switch S$_7$ may be diodes, and the sixth controllable switch S$_6$ and the eighth controllable switch S$_8$ may be semiconductor field effect transistors, or the fifth controllable switch S$_5$, the sixth controllable switch S$_6$, the seventh controllable switch S$_7$ and the eighth controllable switch S$_8$ may be a combination of any of diodes and metal oxide semiconductor field effect transistors, but the embodiment of the invention is not limited thereto. The third embodiment is a preferable embodiment.

Figure 6:
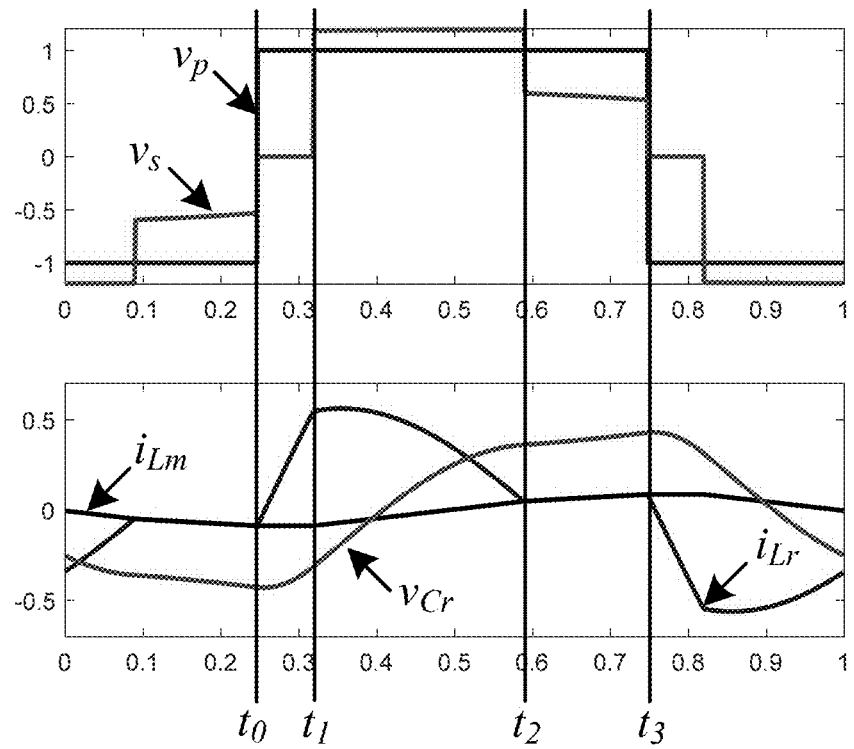
FIG. 6 is a typical working waveform diagram of the resonant converter according to the present disclosure.

A typical working waveform of the resonant converter in the above embodiment is shown in FIG. 6, wherein v$_p$ and v$_s$ represent a primary bridge arm voltage and a secondary bridge arm voltage, i$_{Lr}$ represents a current of the resonant inductor, i$_{Lm}$ represents a current of the magnetizing inductor, and v$_{Cr}$ represents a voltage of the resonant capacitor. Whether the current on the secondary side is discontinuous is associated with the switching frequency and the load, and FIG. 6 makes mathematical explanation to the proposed method taking one mode as an example.

Figure 7:
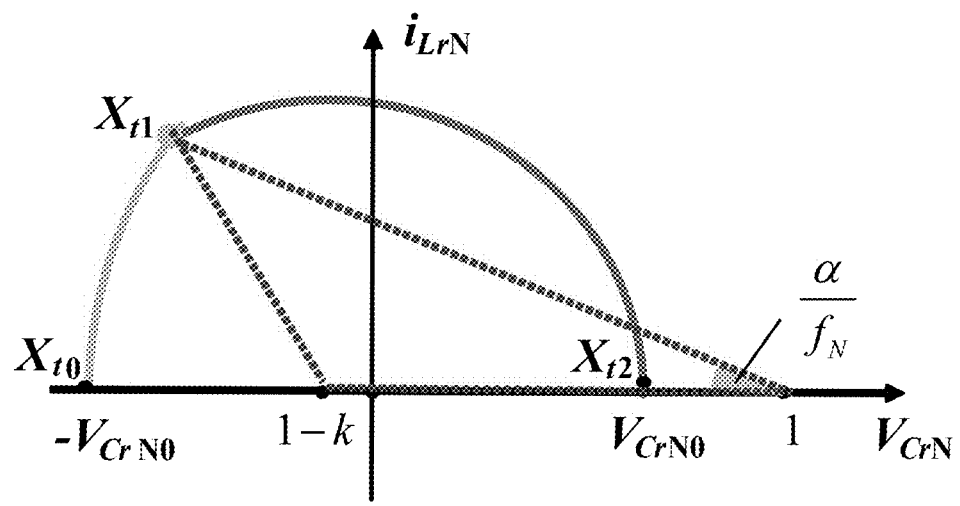
FIG. 7 is a locus diagram of corresponding $V_{CrN}$ and $i_{LrN}$ when a magnetizing current is ignored in FIG. 6.

When a magnetizing current is ignored, a locus diagram of a per unit value V$_{CrN}$ of a voltage of the resonant capacitor, and a per unit value i$_{LrN}$ of a current of the resonant inductor correspondingly in FIG. 6 are shown in FIG. 7.

Referring to FIGS. 6 and 7, k represents a voltage gain, and f$_N$ represents a per unit value of the switching frequency. A center of an arc X$_{t0}$-X$_{t1}$ is (1, 0), corresponding to a waveform from t$_0$ to t$_1$ in FIG. 6, and a center of an arc X$_{t1}$-X$_{t2}$ is (1-k, 0), corresponding to a waveform from t$_1$ to t$_2$ in FIG. 6. An initial value of the voltage of the resonant capacitor may be obtained from the triangle in FIG. 7 using the law of cosines:

$$V_{CrN0} = \frac{1 - \cos\frac{\alpha}{f_N}}{1 + \cos\frac{\alpha}{f_N} - \frac{2}{k}} \quad (1)$$

A phase-shifting angle between the primary side and the secondary side may be obtained by the following formula (2):

$$\cos\frac{\alpha}{f_N} = \frac{1 + \frac{P}{4C_r f V_{in}^2}\left(\frac{2}{k} - 1\right)}{1 + \frac{P_1}{4C_r f V_{in}^2}} \quad (2)$$

In formula (2), a is the phase-shifting angle between the primary side and the secondary side, f is the switching frequency, P$_1$ is output power, wherein the output power P$_1$ equals the output voltage v$_o$ of the second circuit 20 multiplied by the output current of the second circuit 20 here, C$_r$ is the capacitance of resonant resistor, V$_{in}$ represents the input DC voltage V$_{dc}$. As can be known from formula (2), when the output power P$_1$, the input voltage V$_{in}$, the output voltage V$_o$ and the switching frequency f are known, the phase-shifting angle α is determined. Therefore, according to an error of the output voltage, the proposed method can directly control a phase-shifting angle α between the primary side and the secondary side to stabilize the output voltage.

Figure 8:
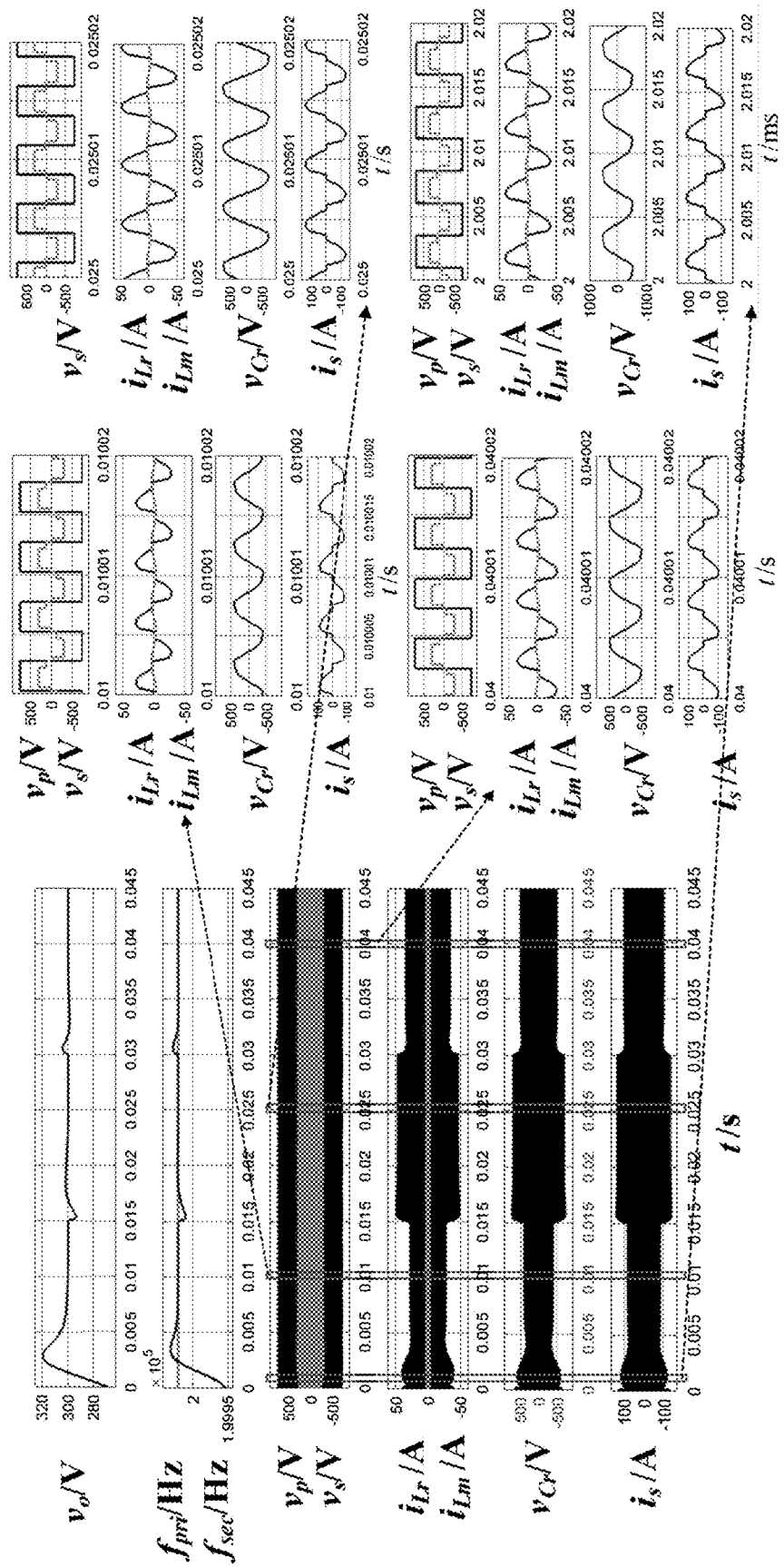
FIG. 8 is a control effect diagram of a single resonant converter of the disclosure when increasing loading or decreasing loading.

Taking non-communication between the primary side and the secondary side of a single LLC resonant converter of the disclosure for example, implementation effects are as follows:

FIG. 8 is a control effect diagram when increasing loading or decreasing loading, wherein f$_{pri}$ represents the primary switching frequency, f$_{sec}$ represents the secondary switching frequency, v$_p$ and v$_s$ represent the primary bridge arm voltage and the secondary bridge arm voltage, is represents a secondary bridge arm current, i$_{Lr}$ represents the current of the resonant inductor, i$_{Lm}$ represents the current of the magnetizing inductor, v$_{Cr}$ represents the voltage of the resonant capacitor, and v$_o$ represents the output voltage. The primary initial switching frequency is f$_{pri0}$=f$_r$+20 Hz, and the secondary initial switching frequency is f$_{sec0}$=f$_r$, f$_r$ is a resonant frequency of the resonant converter. As can be seen, when increasing loading or decreasing loading, waveforms of the output voltage and the resonant tank are stable, and the secondary switching frequency follows the primary switching frequency.

Figure 9:
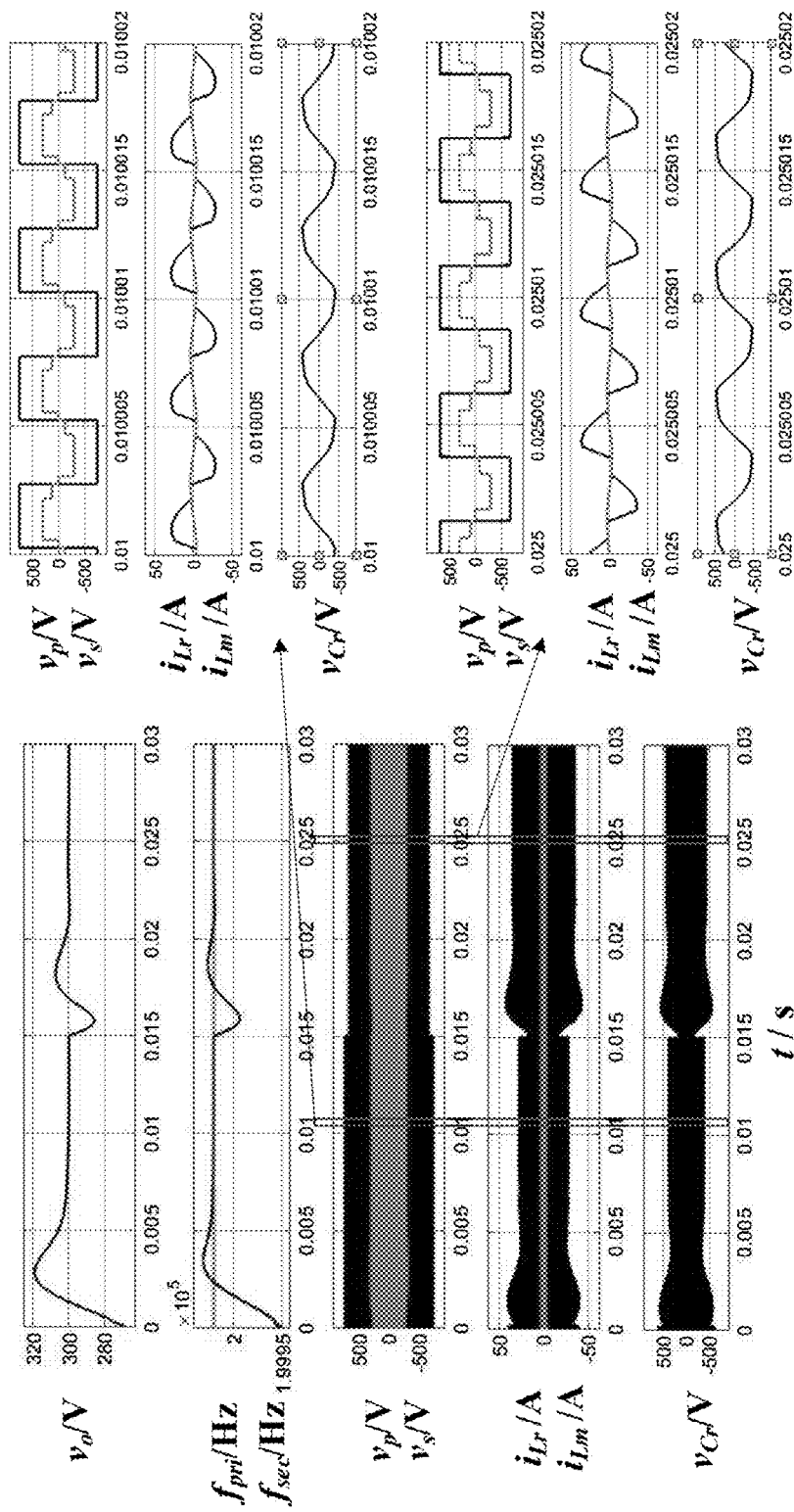
FIG. 9 is a control effect diagram when the input voltage of the resonant converter of the disclosure drops by 10%.
Figure 10:
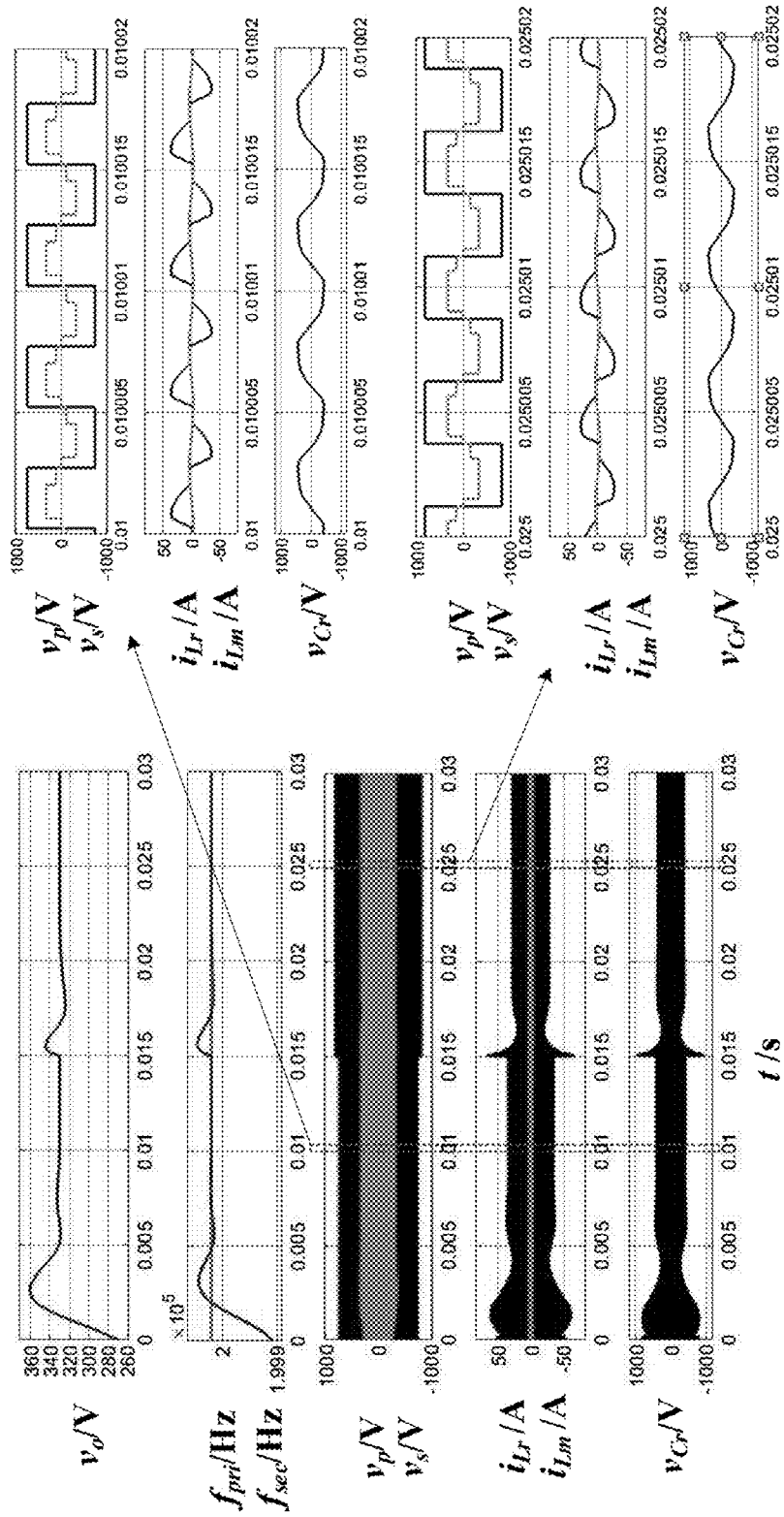
FIG. 10 is a control effect diagram when the input voltage of the resonant converter of the disclosure rises by 10%.

When the input voltage or the primary switching frequency is changed, the resonant converter controls in a closed-loop manner using the output voltage-switching frequency to ensure frequency following and output voltage stability, and control application is flexible. FIGS. 9 and 10 are simulation waveforms when the input voltage drops by 10%, and the input voltage rises by 10% respectively. That is, when the input voltage drops, the phase-shifting angle on the secondary side is automatically increased, waveforms of the output voltage and the resonant tank are stable, and the secondary switching frequency follows the primary switching frequency. Similarly, when the input voltage rises, the phase-shifting angle on the secondary side is automatically decreased, and waveforms of the output voltage and the resonant tank are stable.

Figure 11:
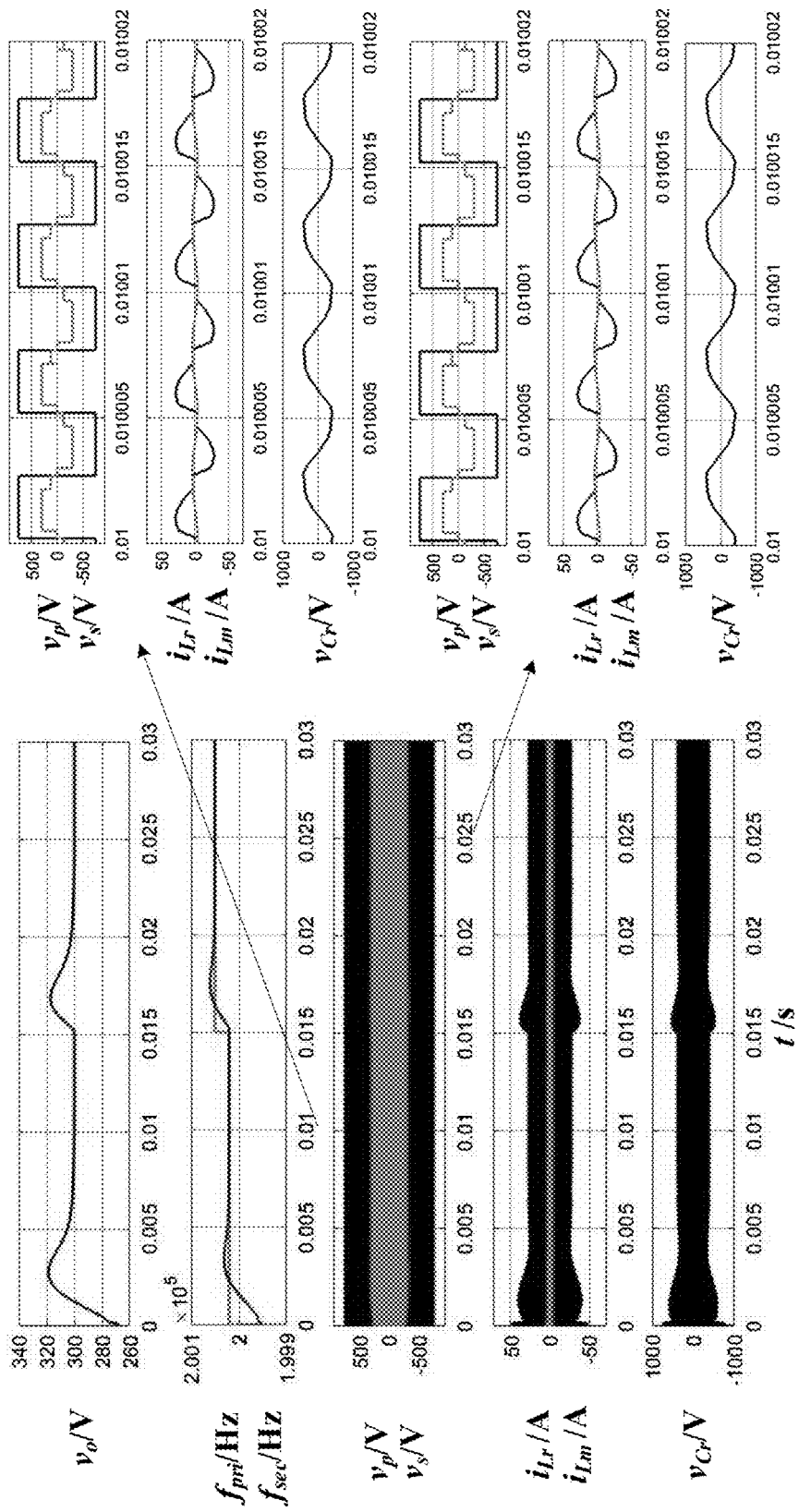
FIG. 11 is a control effect diagram when the primary switching frequency of the resonant converter of the disclosure rises 30 Hz.

FIG. 11 is a control effect diagram when the primary switching frequency rises 30 Hz. The secondary switching frequency follows the primary switching frequency, waveforms of the output voltage and the resonant tank are stable, and after stabilization, the output voltage is equal to the set value.

Based on the resonant converter, the disclosure further provides a cascade system. The cascade system includes at least two cascaded power modules, and each power module includes an AC-DC converter and a DC-DC converter. The DC-DC converter may include the resonant converter for achieving non-communication distributed control of the cascade system. Hereinafter the following takes the SST distributed control as an example for specific description.

Figure 12:
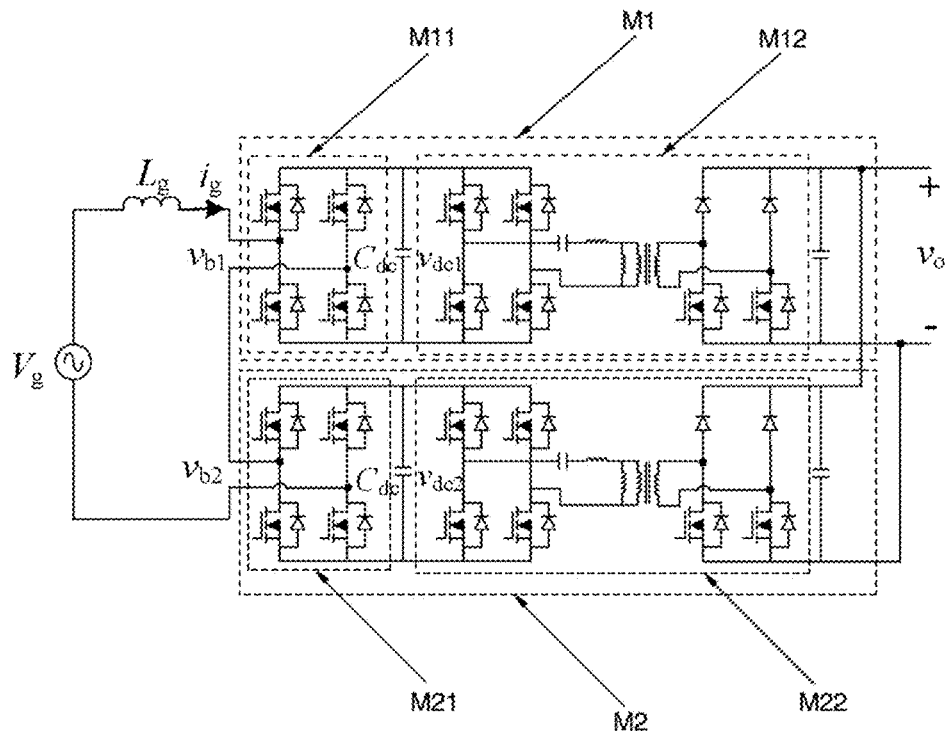
FIG. 12 is a topological diagram of an embodiment of a cascade system according to the disclosure.

FIG. 12 is a topological diagram of a non-communication distributed cascade system of the SST, and takes input series and output parallel of two power modules M1 and M2 for example, but it is also possible to expand to N power modules, and the disclosure is not limited thereto. In this embodiment, a preceding stage (i.e., a A2D stage) of the power modules M1 and M2, for example, can be AC-DC converters M11 and M21, and a post stage (i.e., a D2D stage), for example, can be DC-DC converters M12 and M22, wherein the A2D stage is a cascaded H-bridge topology, $V_g$ is a grid-side voltage, $L_g$ is a grid-side inductor, $i_g$ is a grid-side current, $v_b$ is a bridge arm voltage at the A2D stage, $C_{dc}$ is a DC-link capacitor, $v_{dc}$ is a DC-link voltage, and $v_o$ is the output voltage.

Figure 13:
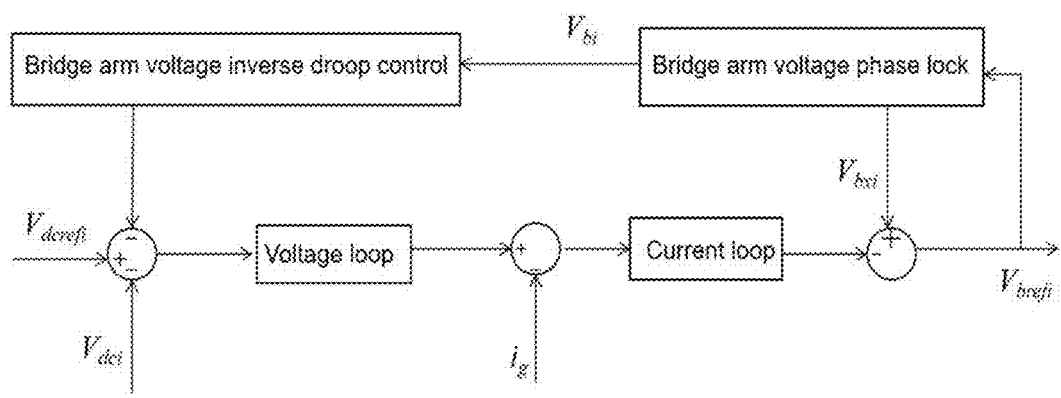
FIG. 13 is a control block diagram where a SST in FIG. 12 controls an A2D portion in a non-communication distributed manner.
Figure 14:
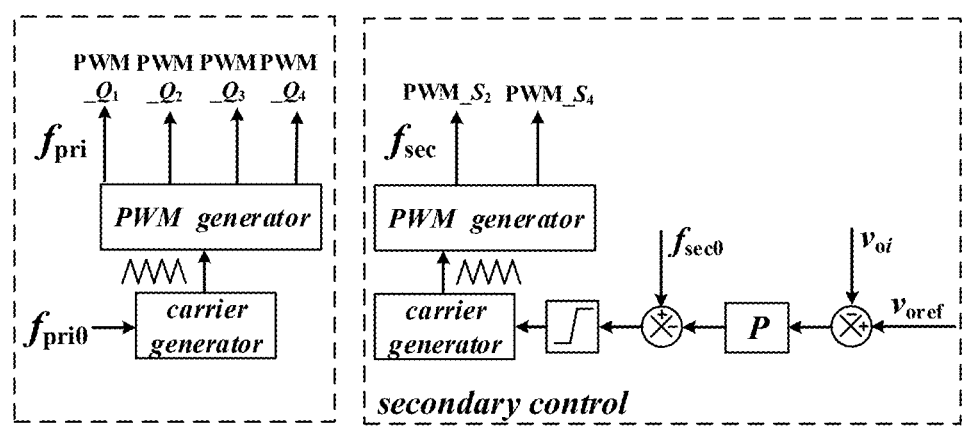
FIG. 14 is a control block diagram where the SST in FIG. 12 controls a D2D portion in a non-communication distributed manner.

A single-mode control block diagram in the SST is shown in FIGS. 13 and 14, FIG. 13 is a control block diagram of the A2D, and FIG. 14 is a control block diagram of the D2D, wherein $v_{dci}$ and $i_g$ are sampling signals of the module itself, i=1, 2 represents a module serial number of the power modules, $v_{dcrefi}$ represents a DC-link voltage reference value, $v_{bi}$ represents a bridge arm voltage amplitude, $v_{bxi}$ represents a sinusoidal fundamental wave signal in phase with the bridge arm voltage, and $v_{brefi}$ represents a bridge arm voltage reference value.

The A2D control achieves non-communication control through the bridge arm voltage amplitude and inverse droop control of the DC-link voltage, and when the amplitude of the bridge arm voltage of the module is decreased, the DC-link voltage reference value of the module is reduced, thereby increasing the bridge arm voltage amplitude of the module, and forming an effect of negative feedback. The D2D control is similar to the control of the resonant converter, so the details are not described here.

Figure 15:
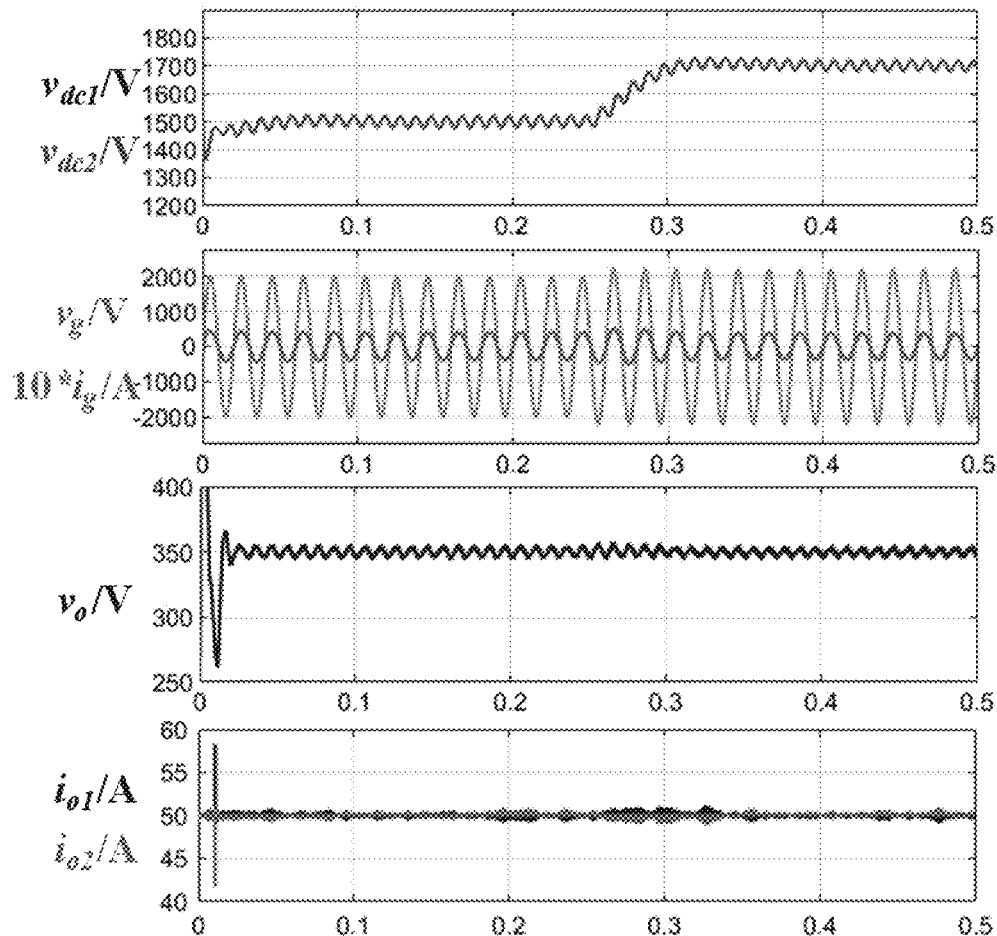
FIG. 15 is a control effect diagram when the input voltage of the cascade system in FIG. 12 rises by 10%.
Figure 16:
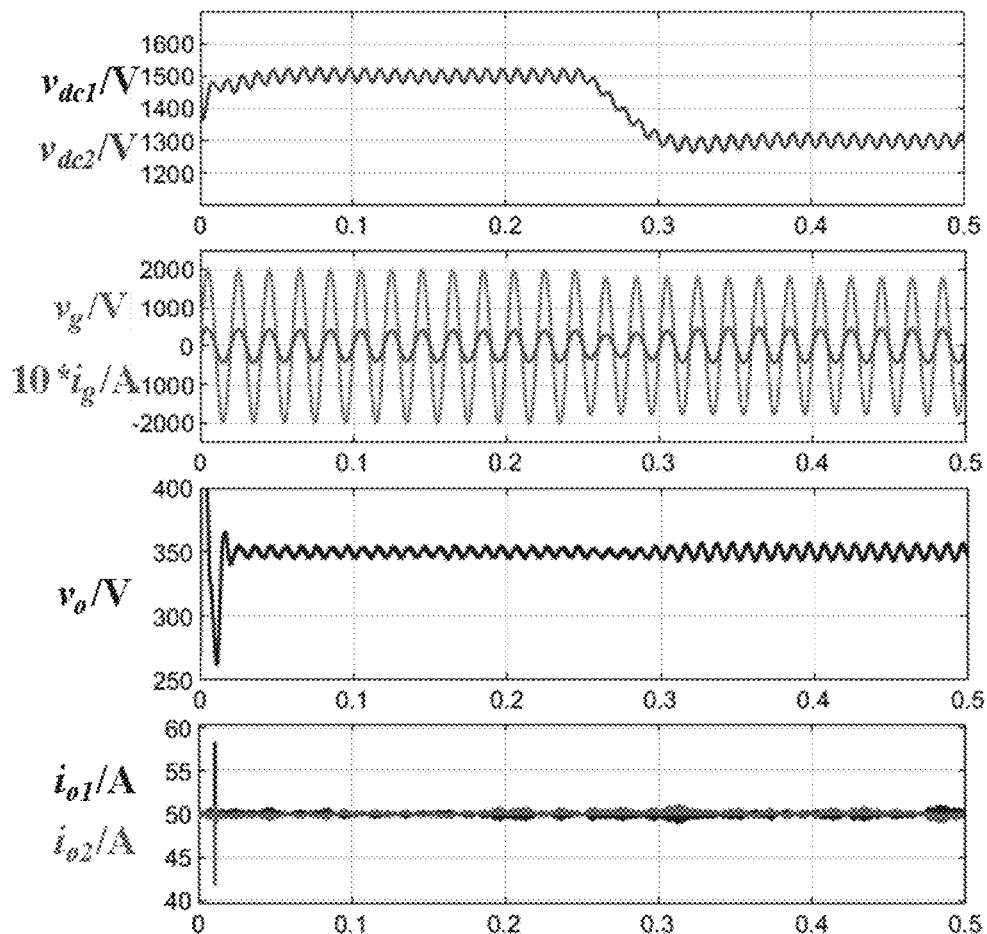
FIG. 16 is a control effect diagram when the input voltage of the cascade system in FIG. 12 drops by 10%.

FIGS. 15 and 16 are respectively control effect diagrams when the power grid voltage rises by 10% and the voltage drops by 10% in the non-communication distributed cascade system of the SST. Results show that although the system has a certain static difference when the power grid voltage changes, it stably realizes the complete non-communication distributed control of the SST.

The resonant converter of the disclosure may be applied to the solid state transformer, and can be applied to places such as quick charging station, photovoltaic power station, data center, energy storage and microgrid. The disclosure includes but not limited to the above listed embodiments.

Figure 17:
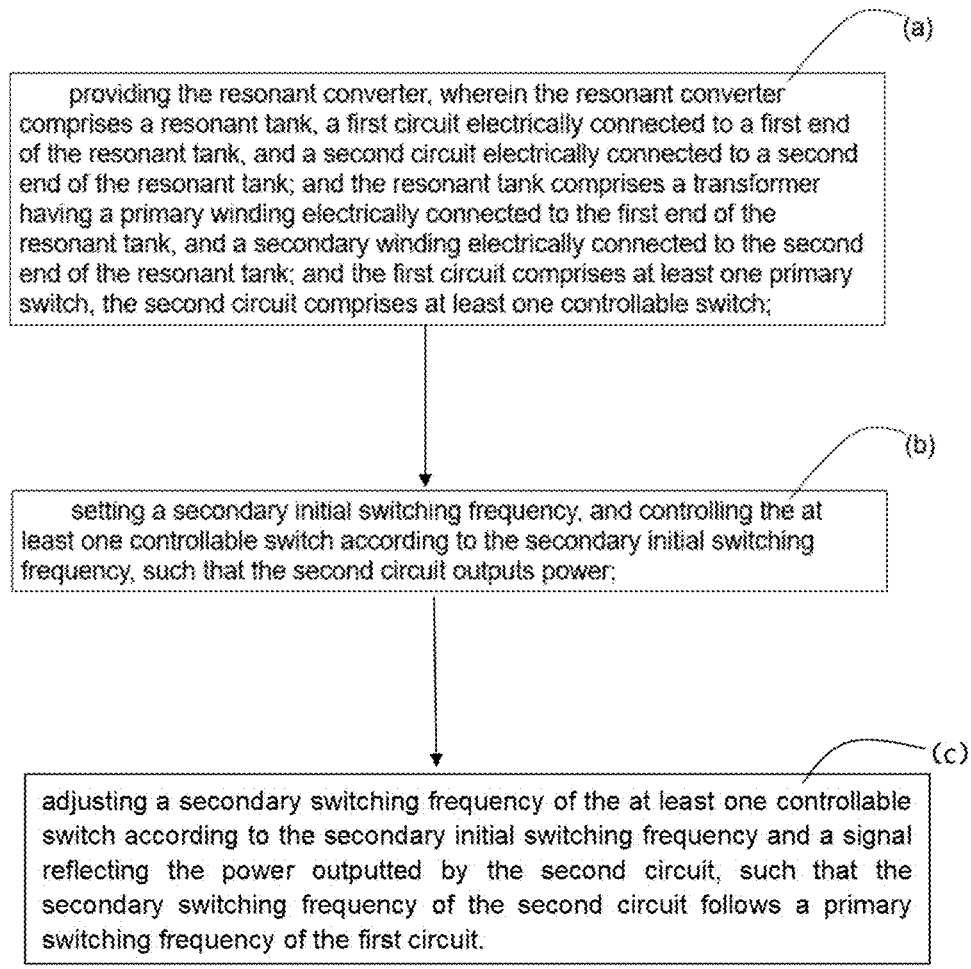
FIG. 17 is a flow diagram of steps of the method for controlling a resonant converter according to the disclosure.

FIG. 17 is a flow diagram of steps of a method for controlling the resonant converter provided in the embodiments of the invention. The control method includes the following steps:

(a) providing a resonant converter, and the resonant converter includes a resonant tank, a first circuit electrically connected to a first end of the resonant tank, and a second circuit electrically connected to a second end of the resonant tank; the resonant tank includes a transformer having a primary winding electrically connected to the first end of the resonant tank, and a secondary winding electrically connected to the second end of the resonant tank; and the first circuit includes at least one primary switch, the second circuit includes at least one controllable switch;

(b) setting a secondary initial switching frequency, and controlling the at least one controllable switch according to the secondary initial switching frequency, such that the second circuit outputs power, and (c) adjusting a secondary switching frequency of the at least one controllable switch according to the secondary initial switching frequency and a signal reflecting the power outputted by the second circuit, such that the secondary switching frequency of the second circuit follows a primary switching frequency of the first circuit.

The Method in the Above Embodiments May Further Include the Following Steps:

setting a primary initial switching frequency, and generating a primary triangular carrier wave through a first carrier generating unit; and comparing the primary triangular carrier wave with a set duty cycle to generate a driving signal of the primary switch through a first PWM generating unit, and the frequency of the driving signal of the primary switch is the primary switching frequency.

In the Method of the Above Embodiments, the Step (b) May Particularly Include:

setting a secondary initial switching frequency, and generating a secondary triangular carrier wave through a second carrier generating unit; and comparing the secondary triangular carrier wave with the set duty cycle to generate a driving signal of the controllable switch through a second PWM generating unit, such that the second circuit outputs the power.

In the Method of the Above Embodiments, the Step (c) Particularly Includes:

sampling the output voltage of the second circuit to compare with a reference output voltage, and outputting a first comparison signal obtained after regulation of a regulator to a frequency comparison module;

comparing a signal frequency outputted from a regulator with the secondary initial switching frequency through a frequency comparison module, and outputting a second comparison signal obtained after amplitude limiting of an amplitude limiter to the second carrier generating unit; and generating the secondary triangular carrier wave from a signal outputted from the amplitude limiter through the second carrier generating unit, and generating a driving signal of the controllable switch through the second PWM generating unit, wherein a frequency of the driving signal is the secondary switching frequency, which follows the primary switching frequency of the first circuit.

In the method of the above embodiments, when the primary switching frequency is the same as the secondary initial switching frequency, the primary switch and the controllable switch act synchronously; when the primary switching frequency is different from the secondary initial switching frequency, the output voltage of the second circuit regulates the secondary switching frequency of the controllable switch in a closed-loop manner, such that the secondary switching frequency automatically follows the primary switching frequency, and controls a phase-shifting angle between the at least one controllable switch and the at least one primary switch to stabilize the output voltage.

As for the detailed embodiment structures and the achieved technical effects of the method in this embodiment, reference may be made to descriptions of the corresponding parts of the resonant converter provided in the above embodiments, so the details are not described here.

As can be Known, the Embodiments of the Invention have at Least One Advantage:

1. Following the switching frequency and controlling the output voltage by sampling the output voltage, thereby achieving non-communication control between the primary and secondary sides of the LLC, and satisfying the requirement for non-communication high efficient operation of the primary and secondary sides of the LLC.
2. Reducing sampling cost without sampling of the resonant tank, and the secondary side can work in a current discontinuous state, thereby reducing turn-off loss of the secondary side.
3. Achieving rising of the output voltage and reducing the frequency modulation range by controlling switches at the secondary side, and solving the problem that it is difficult for the LLC to rise the voltage only through frequency modulation and voltage regulation, and the regulating range of the switching frequency is large, thereby improving efficiency.
4. The disclosure has a wide application range, achieves non-communication distributed control of the SST, and can be widely applied in fields such as charging station, power station and microgrid.

The above descriptions are only illustrative embodiments of the invention, not limitation to the invention in other forms. Any skilled in the art may make modifications or variations using the disclosed technical contents to be equivalent embodiments of equivalent changes applied to other fields, but any simple modifications, equivalent changes and variations to the above embodiments according to the technical essence of the invention without departing from the technical solution of the invention still belong to the scope protected by the technical solution of the invention.

What is claimed is:

1. A resonant converter, comprising:
   a resonant tank having a first end and a second end, wherein the resonant tank comprises a transformer having a primary winding electrically connected to the first end of the resonant tank, and a secondary winding electrically connected to the second end of the resonant tank;
   a first circuit electrically connected to the first end of the resonant tank, wherein the first circuit comprises at least one primary switch; and
   a second circuit electrically connected to the second end of the resonant tank, wherein the second circuit comprises at least one controllable switch;
   wherein the at least one controllable switch is controlled according to a secondary initial switching frequency, such that the second circuit outputs power, and a secondary switching frequency of the at least one controllable switch is adjusted according to the secondary initial switching frequency and a signal reflecting the power of the second circuit, such that the secondary switching frequency of the second circuit follows a primary switching frequency of the first circuit;
   a frequency difference between the secondary switching frequency and the primary switching frequency is generated according to a voltage difference between the output voltage of the second circuit and a reference output voltage, and adjusts the secondary initial switching frequency based on the frequency difference between the secondary switching frequency and the primary switching frequency.

2. The resonant converter according to claim 1, further comprising a primary control module for generating a driving signal of the primary switch according to a signal of the primary switching frequency.

3. The resonant converter according to claim 2, wherein the primary control module comprises a first carrier generating unit and a first PWM generating unit;
   wherein the first carrier generating unit generates a primary triangular carrier wave according to a primary initial switching frequency;
   wherein the first PWM generating unit compares the primary triangular carrier wave, generated by the first carrier generating unit, with a set duty cycle to generate the driving signal of the primary switch, and the frequency of the driving signal of the primary switch is the primary switching frequency.

4. The resonant converter according to claim 1, further comprising a secondary control module, wherein the secondary control module comprises a voltage comparison module, a regulator, a frequency comparison module, an amplitude limiter and a second carrier generating module;
   wherein the output end of the voltage comparison module is connected to the input end of the frequency comparison module through the regulator, and the voltage comparison module is configured to compare an output voltage of the second circuit with the reference output voltage, and transmit a regulated first signal to the frequency comparison module;
   wherein the output end of the frequency comparison module is connected to an input end of the second carrier generating module through the amplitude limiter, and the frequency comparison module is configured to compare a signal frequency outputted from the regulator with the secondary initial switching frequency, and transmit an amplitude-limited second signal to the second carrier generating module;
   wherein the second carrier generating module is configured to generate a driving signal of the controllable switch based on a signal outputted from the amplitude limiter, and the frequency of the driving signal of the controllable switch is the secondary switching frequency following the primary switching frequency.

5. The resonant converter according to claim 4, wherein the second carrier generating module comprises a second carrier generating unit and a second PWM generating unit;
   wherein the second carrier generating unit generates a secondary triangular carrier wave based on the frequency of the signal outputted from the amplitude limiter;
   wherein the second PWM generating unit compares the secondary triangular carrier wave, generated by the second carrier generating unit, with a set duty cycle to generate the driving signal of the controllable switch.

6. The resonant converter according to claim 4, wherein the regulator is a proportional-integral regulator.

7. The resonant converter according to claim 4, wherein the secondary control module is configured that when the primary switching frequency is the same as the secondary initial switching frequency, the primary switch and the controllable switch act synchronously; when the primary switching frequency is different from the secondary initial switching frequency, the output voltage of the second circuit regulates the secondary switching frequency of the controllable switch in a closed-loop manner, such that the secondary switching frequency automatically follows the primary switching frequency, and controls a phase-shifting angle between the at least one controllable switch and the at least one primary switch to stabilize the output voltage.

8. The resonant converter according to claim 1, wherein the primary switch comprises a first switch, a second switch, a third switch and a fourth switch, the first switch and the second switch are connected in series to form a first primary bridge arm, the third switch and the fourth switch are connected in series to form a second primary bridge arm, the first primary bridge arm and the second primary bridge arm are connected in parallel, and the middle point of the first primary bridge arm and the middle point of the second primary bridge arm are electrically connected to the first end of the resonant tank respectively.

9. The resonant converter according to claim 8, wherein the first switch, the second switch, the third switch and the fourth switch are MOSFETs.

10. The resonant converter according to claim 1, wherein the controllable switch comprises a first controllable switch, a second controllable switch, a third controllable switch and a fourth controllable switch, the first controllable switch and the second controllable switch are connected in series to form a first secondary bridge arm, the third controllable switch and the fourth controllable switch are connected in series to form a second secondary bridge arm, the first secondary bridge arm and the second secondary bridge arm are connected in parallel, and the middle point of the first secondary bridge arm and the middle point of the second secondary bridge arm are electrically connected to the second end of the resonant tank respectively.

11. The resonant converter according to claim 10, wherein the first controllable switch and the third controllable switch are diodes, and the second controllable switch and the fourth controllable switch are MOSFETs.

12. The resonant converter according to claim 10, wherein the first controllable switch and the second controllable switch are diodes, and the third controllable switch and the fourth controllable switch are MOSFETs.

13. The resonant converter according to claim 1, wherein the controllable switch comprises a fifth controllable switch, a sixth controllable switch, a seventh controllable switch and an eighth controllable switch connected in series to form a third secondary bridge arm, the second circuit further comprises a capacitor bridge arm formed by a first capacitor and a second capacitor connected in series, the third secondary bridge arm and the capacitor bridge arm are connected in parallel, the middle point of the third secondary bridge arm and the middle point of the capacitor bridge arm are electrically connected, the second end of the resonant tank is electrically connected between the common node of the fifth controllable switch and the sixth controllable switch and the common node of the seventh controllable switch and the eighth controllable switch.

14. The resonant converter according to claim 1, wherein the resonant tank further comprises a resonant capacitor, a resonant inductor and a magnetizing inductor connected in series to the first circuit.

15. The resonant converter according to claim 1, wherein the second circuit works in a discontinuous current mode.

16. A cascade system, comprising at least two cascaded power modules, wherein each of the at least two cascaded power modules comprises an AC-DC converter and a DC-DC converter, and the DC-DC converter comprises the resonant converter as claimed in claim 1.

17. A method for controlling a resonant converter, comprising:
(a) providing the resonant converter, wherein the resonant converter comprises a resonant tank, a first circuit electrically connected to a first end of the resonant tank, and a second circuit electrically connected to a second end of the resonant tank; and
the resonant tank comprises a transformer having a primary winding electrically connected to the first end of the resonant tank, and a secondary winding electrically connected to the second end of the resonant tank; and
the first circuit comprises at least one primary switch, the second circuit comprises at least one controllable switch;
(b) setting a secondary initial switching frequency, and controlling the at least one controllable switch according to the secondary initial switching frequency, such that the second circuit outputs power, and
(c) adjusting a secondary switching frequency of the at least one controllable switch according to the secondary initial switching frequency and a signal reflecting the power outputted by the second circuit, such that the secondary switching frequency of the second circuit follows a primary switching frequency of the first circuit;
a frequency difference between the secondary switching frequency and the primary switching frequency is generated according to a voltage difference between the output voltage of the second circuit and a reference output voltage, and adjusts the secondary initial switching frequency based on the frequency difference between the secondary switching frequency and the primary switching frequency.

18. The method according to claim 17, further comprising:
setting a primary initial switching frequency, and generating a primary triangular carrier wave through a first carrier generating unit; and
comparing the primary triangular carrier wave with a set duty cycle to generate a driving signal of the primary switch through a first PWM generating unit, wherein the frequency of the driving signal of the primary switch is the primary switching frequency.

19. The method according to claim 18, wherein the step (b) further comprises:
setting a secondary initial switching frequency, and generating a secondary triangular carrier wave through a second carrier generating unit; and
comparing the secondary triangular carrier wave with the set duty cycle to generate a driving signal of the controllable switch through a second PWM generating unit, such that the second circuit outputs the power.

20. The method according to claim 18, wherein the step (c) further comprises:
sampling the output voltage of the second circuit to compare with the reference output voltage, and outputting a first comparison signal obtained after regulation of a regulator to a frequency comparison module;
comparing a signal frequency outputted from the regulator with the secondary initial switching frequency through the frequency comparison module, and outputting a second comparison signal obtained after amplitude limiting of an amplitude limiter to the second carrier generating unit; and generating the secondary triangular carrier wave from a signal outputted from the amplitude limiter through the second carrier generating unit, and generating a driving signal of the controllable switch through the second PWM generating unit, wherein the frequency of the driving signal is the secondary switching frequency, which follows the primary switching frequency of the first circuit.

21. The method according to claim 20, wherein when the primary switching frequency is the same as the secondary initial switching frequency, the primary switch and the controllable switch work synchronously; when the primary switching frequency is different from the secondary initial switching frequency, the output voltage of the second circuit adjusts the secondary switching frequency of the controllable switch in a closed-loop manner, such that the secondary switching frequency automatically follows the primary switching frequency, and controls a phase-shifting angle between the at least one controllable switch and the at least one primary switch to stabilize the output voltage.

* * * * *